(12) United States Patent
Rocco et al.

(10) Patent No.: US 11,017,339 B2
(45) Date of Patent: May 25, 2021

(54) COGNITIVE LABOR FORECASTING

(71) Applicant: International Business Machines Corporation, Armonk, NY (US)

(72) Inventors: Carlos Rocco, Heredia (CR); Jose Carlos Alvarez Escobar, San Jose (CR); Pamela S. Vickers, Newark, OH (US); Kurt Abendroth, Nederland, CO (US); Stephanie Natalia Vargas Hernandez, Heredia (CR); Robert S. Casey, II, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 16/267,710

(22) Filed: Feb. 5, 2019

(65) Prior Publication Data
US 2020/0250603 A1      Aug. 6, 2020

(51) Int. Cl.
*G06Q 10/00*    (2012.01)
*G06Q 10/06*    (2012.01)
*G06N 20/00*    (2019.01)

(52) U.S. Cl.
CPC ....... *G06Q 10/06315* (2013.01); *G06N 20/00* (2019.01); *G06Q 10/067* (2013.01); *G06Q 10/063112* (2013.01)

(58) Field of Classification Search
None
See application file for complete search history.

(56) References Cited

U.S. PATENT DOCUMENTS

| | | | | |
|---|---|---|---|---|
| 8,200,527 | B1* | 6/2012 | Thompson | G06Q 10/06398 705/7.39 |
| 10,192,173 | B2* | 1/2019 | Stephens | G06N 5/04 |
| 10,410,298 | B1* | 9/2019 | Basu | G06N 3/126 |
| 10,453,454 | B2* | 10/2019 | Homma | G10L 15/26 |
| 10,677,037 | B1* | 6/2020 | Basu | G01V 99/005 |
| 2007/0073576 | A1* | 3/2007 | Connors | G06Q 10/06 705/7.25 |

(Continued)

OTHER PUBLICATIONS

Tanizaki, Takashi, Demand Forecasting in Restaurants, Jul. 18-20, 2018, ScienceDirect, https://reader.elsevier.com/reader/sd/pii/S2212827119301568?token=C9FADA206E5CA4D4DED7C090C89E9EFC39344767671C60A5A981A4A621C6985600F7DE7CC33338F4472C97D70436B774, p. 1-5.*

(Continued)

*Primary Examiner* — Joseph M Waesco
(74) *Attorney, Agent, or Firm* — Patterson + Sheridan, LLP

(57) ABSTRACT

Method and apparatus uses statistical principles to evaluate historical labor performance of an organization and to predict future labor needs. A system may identify patterns based on seasonality and recent performance, as well as identify parametric drivers. Illustrative parametric drivers may include a skill type, a location, and an experience level of a worker. The system may use the parametric drivers to determine and output labor needs. The communicated labor needs may enable leaders to take action to ensure that the right skill is available at the right time and in the right place for their company. The system may couple the prediction of labor needs with a prediction of labor availability to predict shortages and surpluses so that the workforce may be re-skilled or redeployed as needed.

20 Claims, 6 Drawing Sheets

(56) References Cited

U.S. PATENT DOCUMENTS

| | | | | |
|---|---|---|---|---|
| 2011/0054973 | A1* | 3/2011 | Deich | G06Q 30/0202 705/7.23 |
| 2013/0262174 | A1* | 10/2013 | Singh | G06Q 10/06 705/7.25 |
| 2014/0278755 | A1* | 9/2014 | Eberl | G06F 16/2455 705/7.29 |
| 2014/0280193 | A1* | 9/2014 | Cronin | G06F 16/244 707/741 |
| 2015/0347942 | A1* | 12/2015 | Adhikari | G06Q 10/06315 705/7.22 |
| 2016/0125011 | A1* | 5/2016 | Petschulat | G06F 3/04842 707/722 |
| 2017/0006135 | A1* | 1/2017 | Siebel | H04L 69/40 |
| 2018/0137525 | A1* | 5/2018 | Cotton | G06N 5/04 |
| 2018/0191867 | A1* | 7/2018 | Siebel | H04L 67/12 |
| 2018/0365604 | A1* | 12/2018 | Farooq | G06Q 30/0201 |
| 2018/0367466 | A1* | 12/2018 | Shear | H04L 47/70 |
| 2018/0367467 | A1* | 12/2018 | Shear | H04L 63/10 |
| 2019/0066133 | A1* | 2/2019 | Cotton | G06N 5/04 |
| 2019/0188742 | A1* | 6/2019 | Vasudevan | G06Q 10/063112 |
| 2019/0295032 | A1* | 9/2019 | Tilly | G07F 7/06 |
| 2019/0325534 | A1* | 10/2019 | Perry | G06Q 10/08345 |
| 2019/0332978 | A1* | 10/2019 | Farooq | G06Q 30/0201 |
| 2019/0333163 | A1* | 10/2019 | Perry | G06F 9/451 |
| 2019/0357501 | A1* | 11/2019 | Wagoner | A61K 31/00 |
| 2020/0184494 | A1* | 6/2020 | Joseph | G06Q 10/04 |
| 2020/0196958 | A1* | 6/2020 | Penders | A61B 5/7267 |
| 2020/0210920 | A1* | 7/2020 | Joseph | G06N 20/00 |

OTHER PUBLICATIONS

Jussi Ahokas, Juha Honkatukia, Kimmo Marttila, "Forecasting Demand for Labour and Skills With an Age-Model in Finland," Government Institute for Economic Research—Finland, 2009.

Kelly S. Mikelson, Matt Giani, Christopher T. King, Amna Khan, "Estimating Labor Demand and Supply in Texas: How Planning Tools and Data Are Used," Jul. 2014.

* cited by examiner

COGNITIVE LABOR FORECASTING

BACKGROUND

The present invention relates to computing systems, and more specifically, to artificial intelligence systems and networked processes.

Human resource driven organizations become inefficient and can miss opportunities when they cannot position the right people, at the right time, and in the right place. Despite allocating large amounts of man-hours to the task, it remains difficult to find and train candidates to perform critical tasks when and where they are needed. The challenge of keeping up with changing workforce demands is exacerbated by the constantly fluid nature of global business enterprises.

SUMMARY

According to one particular embodiment, a computer-implemented process for cognitive labor forecasting includes in response to receiving information including a historical record of labor claims at a level of employee and date detail, employee function detail, contract and service details, aggregating labor facts into selective units of analysis including additional fields as place holders added to each unit of analysis comprising structured information from external sources; modeling the information received, using a selected one of a set or predetermined models, to fit historical data comprising the historical record of claimed labor by each role/function to estimation parameters projected into future months used in a scoring operation using parameters for a model including seasonality factors, pipeline for contracts and projects, business related levers and external references including an expert forecast; evaluating a result of modeling to determine a fit of model factors within the selected model; assigning a confidence level to the model using a determination of fit of model factors within the selected model; generating a set of fact predictions under selected scenarios, where the selected scenario is one of a steady state scenario and a what-if scenario and depends on the model factors that fit in the result of modeling and where posteriori feedback from a user is used to adjust a scenario and a forecast and where corrections from the feedback are oriented to provide a confidence score for results based on the feedback; receiving expert feedback as a priori feedback comprising human input and alternative data sources contributing as one of direct and indirect information on one of forecast drivers and a forecast, where the expert feedback is evaluated within the selected model to augment learning within and accuracy of the selected model; generating a visualization of the selected scenario enabling raw data from previous scenarios for drill down, model factors to be tweaked to affect a respective forecast, sharing of a user modified visualization, creating a library of visualizations and assignment of an opinion to each visualization in the library; and capturing feedback from the user through the visualization comprising an evaluation for forecast results for each visualization and details within the visualization, correct scenario settings, corresponding to realized facts and user knowledge of correct factor settings and user opinions on available visualizations, where the user feedback is used for a ranking criterion and identifying parameter settings, using one of a ranking and a weighted average to tweak scoring settings, and adjust model fit to a respective scenario.

According to another particular embodiment, an apparatus includes a data module configured to retrieve information including a historical record of labor claims at a level of employee and date detail, employee function detail, contract and service details, and to aggregate labor facts into selective units of analysis including additional fields as place holders added to each unit of analysis comprising structured information from external sources; a modeling module configured to model the information received, using a selected one of a set or predetermined models, to fit historical data comprising the historical record of claimed labor by each role/function to estimation parameters projected into future months used in a scoring operation using parameters for a model including seasonality factors, pipeline for contracts and projects, business related levers and external references including an expert forecast; a model fit module configured to evaluate a result of modeling to determine a fit of model factors within the selected model; a confidence module configured to assign a confidence level to the model using a determination of fit of model factors within the selected model; a predictive models module configured to generate a set of fact predictions under selected scenarios, where the selected scenario is one of a steady state scenario and a what-if scenario and depends on the model factors that fit in the result of modeling and where posteriori feedback from a user is used to adjust a scenario and a forecast and where corrections from the feedback are oriented to provide a confidence score for results based on the feedback; a feedback module configured to receive human input and alternative data sources contributing as one of direct and indirect information on one of forecast drivers and a forecast, where feedback is evaluated within the selected model to augment learning within and accuracy of the selected model; and a visualization module configured to generate a visualization of the selected scenario enabling raw data from previous scenarios for drill down, model factors to be tweaked to affect a respective forecast, sharing of a user modified visualization, creating a library of visualizations and assignment of an opinion to each visualization in the library; where the feedback is captured through the visualization comprising an evaluation for forecast results for each visualization and details within the visualization, correct scenario settings, corresponding to realized facts and user knowledge of correct factor settings and user opinions on available visualizations, where the user feedback is used for a ranking criterion and identifying parameter settings, using one of a ranking and a weighted average to tweak scoring settings, and adjust model fit to a respective scenario.

According to another particular embodiment, a program product includes program product configured to, in response to receiving information including a historical record of labor claims at a level of employee and date detail, employee role detail, contract and service details, aggregate labor facts into selective units of analysis including additional fields as place holders added to each unit of analysis comprising structured information from external sources; model the information received, using a selected one of a set or predetermined models, to fit historical data comprising the historical record of claimed labor by each role/function to estimation parameters projected into future months used in a scoring operation using parameters for a model including seasonality factors, pipeline for contracts and projects, business related levers and external references including an expert forecast; evaluate a result of modeling to determine a fit of model factors within the selected model; assign a confidence level to the model using a determination of fit of model factors within the selected model; generate a set of fact predictions under selected scenarios, where the selected scenario is one of a steady state scenario and a what-if scenario and depends on the model factors that fit in the result of modeling and where posteriori feedback from a user is used to adjust a scenario and a forecast and where corrections from the feedback are oriented to provide a confidence score for results based on the feedback; receive expert feedback as a priori feedback comprising human input and alternative data sources contributing as one of direct and indirect information on one of forecast drivers and a forecast, where the expert feedback is evaluated within the selected model to augment learning within and accuracy of the selected model; generate a visualization of the selected scenario enabling raw data from previous scenarios for drill down, model factors to be tweaked to affect a respective forecast, sharing of a user modified visualization, creating a library of visualizations and assignment of an opinion to each visualization in the library; and capture feedback from the user through the visualization comprising an evaluation for forecast results for each visualization and details within the visualization, correct scenario settings, corresponding to realized facts and user knowledge of correct factor settings and user opinions on available visualizations, where the user feedback is used for a ranking criterion and identifying parameter settings, using one of a ranking and a weighted average to tweak scoring settings, and adjust model fit to a respective scenario.

DETAILED DESCRIPTION

Figure 1:
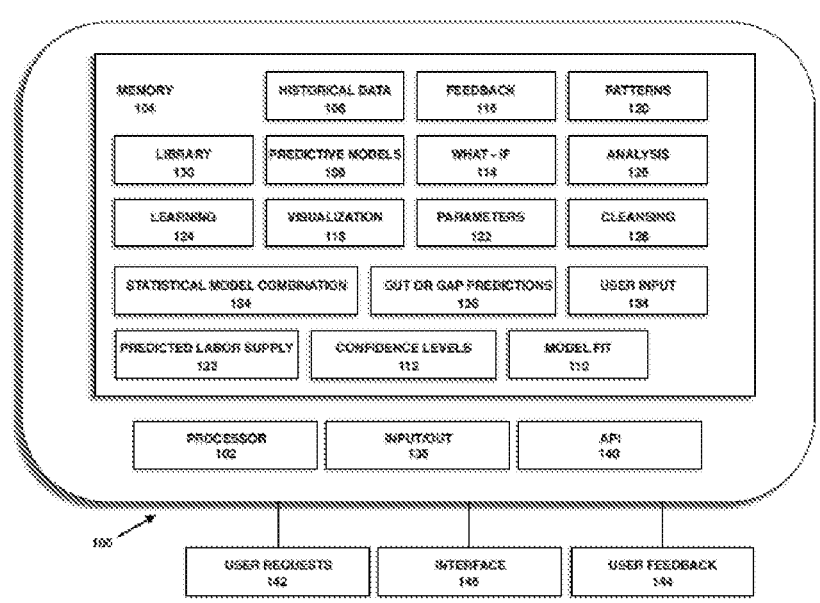
FIG. 1 is a block diagram of an embodiment of a system that uses statistical principles and cognitive processes to evaluate historical labor performance of an organization and to predict future labor needs.

An embodiment of a system and associated processes use statistical principles to evaluate historical labor performance of an organization and to predict future labor needs. The system may identify patterns based on seasonality and recent performance, as well as identify parametric drivers. Illustrative parametric drivers may include a skill type, a location, and an experience level of a worker. The system may use the parametric drivers to determine and output labor needs. The communicated labor needs may enable leaders to take action to ensure that the right skill is available at the right time and in the right place for their company. The system may couple the prediction of labor needs with a prediction of labor availability to predict shortages and surpluses so that the workforce may be re-skilled or redeployed as needed.

A particular embodiment comprises a reliable tool that provides data to leaders of large organizations to enable decisions regarding when to re-train, reallocate, hire, or let go of resources. The system may thus facilitate timely and informed decisions that translate into significant cost savings. An embodiment of the system may predict labor needs in advance so an organization can retrain or shift resources to perform critical tasks when and where they are needed. In this manner, an embodiment of the automated system minimizes unexpected workforce shortages.

Cognitive processes improve prediction accuracy levels over time, requiring less human intervention. As circumstances impacting workflow change over time, the predictions may change to account for the changes. In one aspect, the system may provide, retrieve, and make logical connections between data to glean insights that are helpful to predict when it is appropriate to retrain current resources. Early identification of when to retrain and which skills to focus upon may allow the organization to meet future needs of the business at the right time.

The automated cognitive processes may help eliminate much of the time spent on manually attempting to predict future labor needs. For instance, the automated processes sift through large amounts of data, such as historical labor time tracking information and skills data. An embodiment of a cognitive labor forecasting tool may more particularly ingest the large historical data sources that represent assets for the organization. This may include a processor accessing remote computing devices, including databases, to retrieve selected data. The system may leverage statistical modeling tools and techniques, and apply cognitive technology to enable the labor prediction to become more helpful with every application.

In the above manner, the system may help eliminate the need to manually sift through amounts of historical data not possible without thousands of man-hours. An embodiment of the system obviates the need to rely on experts opinions to predict where, when and how many skilled resources are needed. The system may ingest external data that is both structured and unstructured. Structured data may refer to information with a high degree of organization, such that inclusion in a relational database is seamless and readily searchable by simple, straightforward search engine algorithms or other search operations. Unstructured data may be essentially the opposite. Accessing such data may enable the user to bring relevant market forces into the predictive modeling in order to influence the outcome of the predictions. External forces may shift the needs of the work force. As such, the system may acquire and process both external and internal forces in its predictive modeling.

In another aspect, the system may support what-if analyses so expert users may influence the outcome of the predictive modeling by manipulating levers that would drive various outcomes. An example of this manipulation may be when an expert becomes aware of a significant event, such as a merger or acquisition. The events may result in introducing large increases in the workforce along with increases in the scope and type of work. Providing the opportunity to perform what-if analyses gives insights into how such dramatic changes might influence the predicted labor workforce needs.

In another aspect, the system may include a graphical visualization interface module. The module may include more than charts and graphs to provide an ability to reveal otherwise hidden trends and nuances of big data. The graphical visualization interface module may use different filters and types of visual representations to drill down into the data.

The system may include a learning technology module. The learning technology module may continuously improve the accuracy of the predictions by constantly learning from each iteration of actual data. The learning technology may also improve predictability by ingesting external data (e.g., structured and unstructured) that influences the outcome of the prediction. The learning technology may improve the outcome of the prediction by allowing the what-if analysis module of the system to give an expert the ability to influence the outcome based on their knowledge of events otherwise unknown to the model.

An embodiment of the predictive labor system may rely on historical labor data. More particularly, three relevant data sources may include historical labor data describing time spent by resources on work performed in the past. Another type may include information describing the type of resources performing the work, such as skills and cost. A third type may include information describing the type of the work performed, such as what contracts the work has been performed for, and/or the nature of the work performed. Particularly the two former historical data sources are useful in generating meaningful labor predictions for the future.

An embodiment of the system may include a data cleansing module to automatically perform a data cleansing process. An example of the data cleansing may include simple formatting changes, in addition to more sophisticated operations to convert a data unit of measures or currency. The processor may further combine with other data sources to ensure consistency in the data for further processing.

Once data cleansing occurs, the cleaned and joined data sources may be analyzed by an analysis module to determine, among other things, those parameters may be used for statistical modeling. The quality and volume of data, along with additional related, aspects of the data, will be factors in determining the complexity of the analysis.

Once the data is analyzed, a statistical modeling technique may be applied using algorithms that are either proprietary or commercially available, or some combination of the two, to prepare a predictive model. The model must be fit to the circumstances of data quality, completeness, and desired outcomes of the prediction.

A graphical representation of the model output may be charts created using a spreadsheet tool, or a more sophisticated approach to representing the data graphically so that visualizations may be created when many parameters by which the data could be analyzed are present. The system may receive feedback from the end user to improve model output.

An embodiment may ingest and process both structured and unstructured data sources into the model. This adds a dimension to the prediction of the workforce needs that go beyond the borders of the organization. By ingesting data that is external to the organization (e.g., market reports relevant to the future of the industry being served, and/or the workforce prominently featured in the organization), the model may provide many more insights to the user that go beyond what an internal expert may be able to possess. Structured data is more readily searchable by basic algorithms. Examples include spreadsheets and data from machine sensors. Unstructured data is more like human language and may not readily fit into relational databases. Searching unstructured data may also be more conventionally challenging. The framework provides for an automated approach to this work intended to minimize the need for humans to ingest the structured and unstructured data.

The system may include an interface module that may allow information to flow back to the model. Further, as the maturity of the model increases, that system may layer additional internal data sources into the framework to add more insights to train the model to become more able to predict the influences of these data sources on the needs of resources. For example, added internal data sources may include sales projections that are served by segments of the workforce.

Embodiments of the system may also include a what-if interface module that will allow recipients of the labor prediction to perform what-if analysis. The what-if analysis may be based on a manipulation of parameters influencing the outcome of the prediction. An example of one of these parameters may include manipulating growth projections of a segment of a business.

Learning technology module processes may employ learning technology that is infused into the framework. The learning technology may leverage algorithms designed to enable the system to become more and more accurate in its predictions as each incremental piece of information is ingested.

According to one particular implementation, illustrative data includes a historical record of labor claims, including details identifying employ records and dates. Additional fields may capture the role and function of employees. Contract and service details may also be included to provide for a deeper drill down of data.

Data may be retrieved from local and remote computing resources, or a data engineer may periodically access and update data. In this manner, the system may automatically and continuously update the latest labor claims, employee roles, and any additional information.

The system may prepare data to aggregate labor facts into the units of analysis. Unit of analysis selection by a processor may depend on an estimation that is useful for a given purpose. Each unit of analysis may also include additional fields or place holders. The additional fields may be added and may include structured information from external sources or from process feedback loops.

Regarding the statistical modeling module processes, the system may fit historical data to estimation parameters. Such data may be updated periodically as described herein with reference to the learning technology module. In one example, employee hours within a unit of time may be modeled. The unit of time choice may depend on the reporting in place. The model may be determined to fit the historical record of claimed labor by each role/function. The record may be projected into future (e.g., by months) by the system in a scoring step. In one scenario, the system may determine that a unit of time may not have a uniform distribution of hours. For example, a unit may be listed in months, while other units are listed by week. In response, the system may initiate a first correction to make the hours uniform across units. Continuing with the above example, the system may take a weekly average of the unit listed in months to convert the unit of measurement to weeks.

Predictors of an embodiment of a model may include seasonality factors, covariate and other variables, such as the time of a month or year, an end of a fiscal quarter, or a processing milestone. Other predictors may include pipeline and logistical considerations for contracts or projects, as well as business related levers. External references, as expert forecast or ecological factors may be included when available.

Model factors may be fit within the model, and the model factors may be evaluated and assigned a confidence level. The confidence level assignment may include expert feedback. While many different models may be selected by the system, one determination may be made based on whichever model allows lever parameterization so that scoring levers may be applied.

A scoring module of an embodiment may generate fact predictions (i.e., forecasts) under selected scenarios. Each scenario may depend on a business question to solve. In general, the scenario may reduce to the application of the available levers, or factors, that were fit in the modelling step.

In a steady state scenario example, the system may assume that current conditions remain constant. That is, the conditions are either the same as they were during a last unit of time, a (e.g., weighted) average for the last units of time, or with a similar constant trend over time. The system may use model parameter values from a lever composition derived from a function of the last units of time. In a what-if scenario, the system may assume specific scenarios for future unit of times, regardless of past situations. The system may use model parameter values to fit an arbitrary future scenario.

A posteriori feedback from a user may be used to adjust the scenario and forecast. Corrections from user feedback may be oriented to provide a confidence score for results based on user opinion. The corrections may also be used to produce a new scenario that makes the necessary shift from a steady state scenario to accommodate realized facts that happened after the model fit. Because the posteriori feedback may not be evaluated within model fitting, the feedback may contribute a complementary, or parallel, confidence rating related to realized facts, a user opinion, and so on.

An expert feedback module may allow the system to receive expert feedback from a business or other final user. Expert feedback may include human input or alternative data sources that contribute with direct or indirect information relating to forecast drivers, or even a forecast itself. The data may be joined through the interface and may go to the data modeling. Feedback may be structured as being new fields. Measurement levels may be defined as required. Expert feedback may be evaluated within a model, and so the feedback can be used to estimate its uncertainty. In this manner, feedback modelling may allow learning and increased accuracy.

A visualization module may be used to initially display scenarios. Raw data from previous scenarios may also be available to drill down to more detail. Model levers may be allowed to be tweaked to affect forecasts. User modified visualization may be shared with other users. Levers, or model parameters, tweaked by the user may be saved.

An average for scenario settings as well as each scenario created by a user may be stored and shared with other users, and a library may be created. A new user may be capable of accessing each visualization in the library, as well as choosing new scenarios that result from an average of the levers of selected users. A new user may also be able to assign an opinion to each visualization in the library.

A final user feedback module may capture final user feedback through visualization, and may be provided for a detailed or overview level. Feedback may include an evaluation for forecast results for each visualization and details within a visualization operation. The feedback may also include correct scenario settings that correspond closely to realized facts or user knowledge on correct levers settings. Other feedback may comprise opinions on available visualizations.

The first use of user feedback may be in connection with visualization (e.g., for a ranking criterion). A second use of user feedback may be to ensure the most accurate levers (i.e., parameters) settings, either through a ranking or a weighted average. The lever/parameter values may be used to tweak scoring settings and to adjust model fit to the most accurate or convenient, scenario. Setting correct values in the scoring phase (and based on a model) may allow a more accurate and objective estimations of future facts.

A predicted labor supply approach may leverage databases to currently available resources of the workforce of a company. The approach may use statistical modeling techniques. The system may use data sources that are internal to the company to factor in attrition, as well as planned or unplanned growth. An embodiment of the system may combine algorithms to articulate a monthly predicted labor supply expressed in terms of a calculated full time equivalent (FTE) for each of the skill groupings by geographic region.

According to another embodiment, a predicted labor demand approach may be determined by bringing together two statistical models. A first model may predict labor demands for all existing business. The second model may predict existing demand for new business. Each model may use statistical principles to predict the labor needs based on historical data sources such as labor claiming and contract data for existing business. The models may be combined to articulate a monthly predicted labor demand. The monthly predicted labor demand may be expressed in terms of a calculated FTE for each of the skill groupings by geographic region.

Another embodiment of the system may perform processes directed towards a predicted labor gaps and gluts approach. Gaps and gluts processes may include a calculation that subtracts the demand from the supply. The gaps and gluts may be calculated and expressed in terms of a monthly predicted labor gap (e.g., where a shortage is predicted) or glut (e.g., where an excess of resource is predicted). The gaps and gluts may be expressed in terms of a monthly calculated FTE gap or glut for each of skill grouping by geographic region. The system may output results that show a monthly average gap or glut for each of the grouping.

An embodiment of a system and associated processes uses statistical principles to evaluate historical labor performance of an organization and to predict future labor needs. The system may identify patterns based on seasonality and recent performance, as well as identify parametric drivers. Illustrative parametric drivers may include a skill type, a location, and an experience level of a worker. The system may use the parametric drivers to determine and output labor needs. The communicated labor needs may enable leaders to take action to ensure that the right skill is available at the right time and in the right place for their company. The system may couple the prediction of labor needs with a prediction of labor availability to predict shortages and surpluses so that the workforce may be re-skilled or redeployed as needed.

An embodiment comprises a reliable tool that provides data to leaders of large organizations to enable decisions regarding when to re-train, reallocate, hire, or let go of resources. The system may thus facilitate timely and informed decisions that translate into significant cost savings. An embodiment of the system may predict labor needs in advance so an organization can retrain or shift resources to perform critical tasks when and where they are needed. In this manner, an embodiment of the automated system minimizes unexpected workforce shortages.

Cognitive processes improve prediction accuracy levels over time, requiring less human intervention. As circumstances impacting workflow change over time, the predictions may change to account for the changes.

Turning now to the Drawings, FIG. 1 is a block diagram of an embodiment of an apparatus, or system 100, which uses statistical principles and cognitive processes to evaluate historical labor performance of an organization and to predict future labor needs. The illustrative system 100 includes a processor 102 and a memory 104. As represented in the block diagram, the memory 104 includes historical data 106 (e.g., time spent by resources on work performed in the past, a type of resources, and information describing the type of the work performed). The memory 104 may additionally include a predictive model module 108, a model fit evaluation module 110, confidence levels 112, a what-if scenario module 114, and a feedback module 116, as are described herein. As shown in FIG. 1, a visualization module 118, patterns 120, parameters (e.g., levers and predictors) 122, a learning technology module 124, a data cleansing module 126, an analysis module 128, and a library 130 may also be included within the memory 104. The system also includes a predicted labor supply approach module 132, a statistical model combination approach module 134, and a gap or glut prediction module 136.

The system 100 additionally includes an input/output (I/O) 138 module and an application program interface (API) 140 to receive user requests 142 and user feedback 144. To facilitate this interaction, the system may include an interface 146.

The learning technology module 124 may continuously improve the accuracy of the predictions by constantly learning from each iteration of actual data. The learning technology module 124 may also improve predictability by ingesting external data (e.g., structured and unstructured) that influences the outcome of the prediction. The learning technology module 124 may improve the outcome of the prediction by allowing the what-if analysis module of the system to give an expert the ability to influence the outcome based on their knowledge of events otherwise unknown to the model.

The system 100 may use the what-if analyses module 144 so expert users may influence the outcome of the predictive modeling by manipulating levers that would drive various outcomes. An example of this manipulation may be when an expert becomes aware of a significant event, such as a merger or acquisition. The events may result in introducing large increases in the workforce along with increases in the scope and type of work. Providing the opportunity to perform what-if analyses gives insights into how such dramatic changes might influence the predicted labor workforce needs.

The graphical visualization interface module 118 may include more than charts and graphs to provide the ability to reveal otherwise hidden trends and nuances of big data. The graphical visualization interface module may use different filters and types of visual representations to drill down into the data.

The system 100 may provide, retrieve, and make logical connections between data to glean insights that are helpful to predict when it is appropriate to retrain current resources. For instance, the automated processes sift through large amounts of data, such as historical labor time tracking information and skills data. An embodiment of a cognitive labor forecasting tool may more particularly ingest the large historical data 106 that include assets for the organization. In this manner, the system 100 may help eliminate the need to manually sift through amounts of historical data 106 not possible without thousands of man-hours. An embodiment of the system obviates the need to rely on experts opinions to predict where, when and how many skilled resources are needed.

As described herein, the other modules and other components of the system 100 may identify the patterns 120 based on seasonality and recent performance, as well as identify parameters 122, or parametric drivers. Illustrative parameters 122 may include a skill type, a location, and an experience level of a worker. The system 122 may use the parameters 122 to determine and output labor needs. The communicated labor needs may enable leaders to take action to ensure that the right skill is available at the right time and in the right place for their company. The system 100 may couple the prediction of labor needs with a prediction of labor availability to predict shortages and surpluses so that the workforce may be re-skilled or redeployed as needed.

Figure 2:
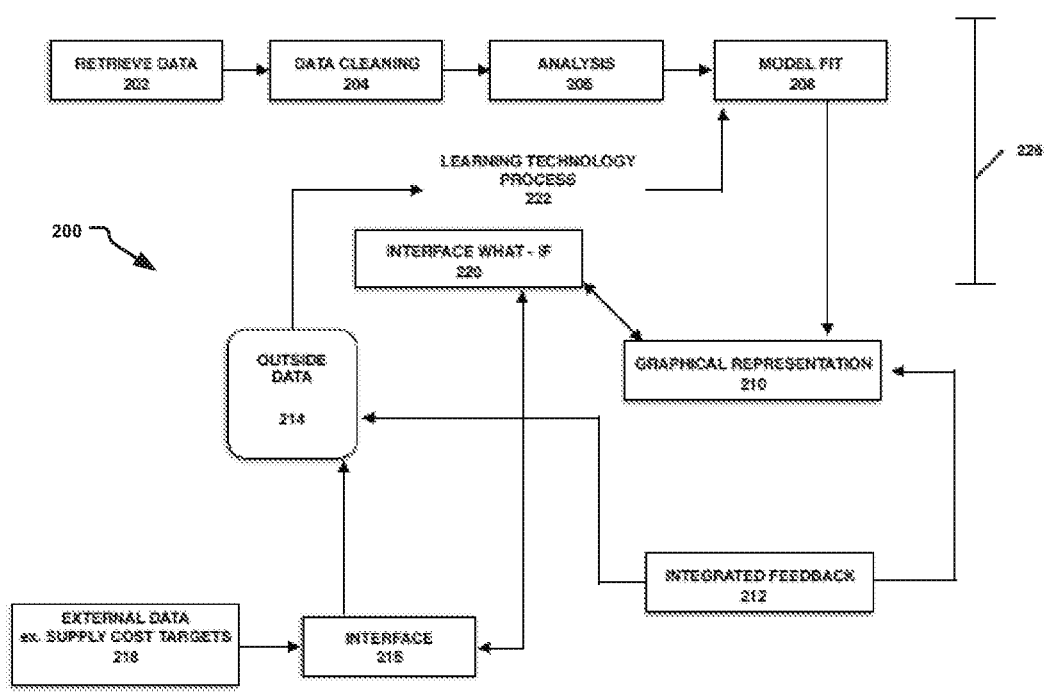
FIG. 2 is an embodiment of a method to use predictive modeling to augment human intelligence to produce prescriptive analytics.

FIG. 2 is an embodiment of a method 200 that may use predictive modeling to augment human intelligence to produce prescriptive analytics. The method 200 may be performed by the system 100 of FIG. 1, for instance. At 202 of the flowchart, they system may perform process that involve data sources internal to an entity. For example, an embodiment of the predictive labor system may rely on historical labor data. More particularly, three relevant data sources may include historical labor data describing time spent by resources on work performed in the past. Another type may include information describing the type of resources performing the work, such as skills and cost. A third type may include information describing the type of the work performed, such as what contracts the work has been performed for, and/or the nature of the work performed. Particularly the two former historical data sources are useful in generating meaningful labor predictions for the future.

At 204, an embodiment of the system may include a data cleansing module to automatically perform a data cleansing process. An example of the data cleansing may include simple formatting changes, in addition to more sophisticated operations to convert a data unit of measures or currency. The processor may further combine with other data sources to ensure consistency in the data for further processing.

Once data cleansing occurs, the cleaned and joined data sources may be analyzed at 206 by an analysis module to determine, among other things, those parameters may be used for statistical modeling. The quality and volume of data, along with additional related, aspects of the data, will be factors in determining the complexity of the analysis.

Once the data is analyzed, a statistical modeling technique may be applied at 208 using algorithms that are either proprietary or commercially available, or some combination of the two, to prepare a predictive model. The model must be fit to the circumstances of data quality, completeness, and desired outcomes of the prediction.

The graphical representation of the model output at 210 may include charts created using a spreadsheet tool, or a more sophisticated approach to representing the data graphically so that visualizations may be created when many parameters by which the data could be analyzed are present. The system may receive feedback from the end user at 212 to improve model output.

An embodiment of the system at 214 may ingest and process both structured and unstructured data sources into the model. This adds a dimension to the prediction of the workforce needs that go beyond the borders of the organization. By ingesting data that is external to the organization (e.g., market reports relevant to the future of the industry being served, and/or the workforce prominently featured in the organization), the model may provide many more insights to the user that go beyond what an internal expert may be able to possess. Structured data is more readily searchable by basic algorithms. Examples include spreadsheets and data from machine sensors. Unstructured data is more like human language and may not readily fit into relational databases. Searching unstructured data may also be more challenging. The framework provides for an automated approach to this work intended to minimize the need for humans to ingest all of this structured and unstructured data.

The system 100 may include an interface module that may allow information at 216 to flow back to the model. As the maturity of the model increases, that system may layer additional internal data sources into the framework at 218 to add more insights to train the model to become more able to predict the influences of these data sources on the needs of resources. For example, added internal data sources may include sales projections that are served by segments of the workforce.

At 220, embodiments of the system may also include a what-if interface module that will allow recipients of the labor prediction to perform what-if analysis. The what-if analysis may be based on a manipulation of parameters influencing the outcome of the prediction. An example of one of these parameters may include manipulating growth projections of a segment of a business.

A learning technology module process at 222 may employ learning technology that is infused into the framework. The learning technology may leverage algorithms designed to enable the system to become more and more accurate in its predictions as each incremental piece of information is ingested. As indicated in FIG. 1, bracket 224 may denote modeling processes, while bracket 226 denotes scoring. Bracket 228 shows priori, posteriori, and non-structured processes.

Figure 3:
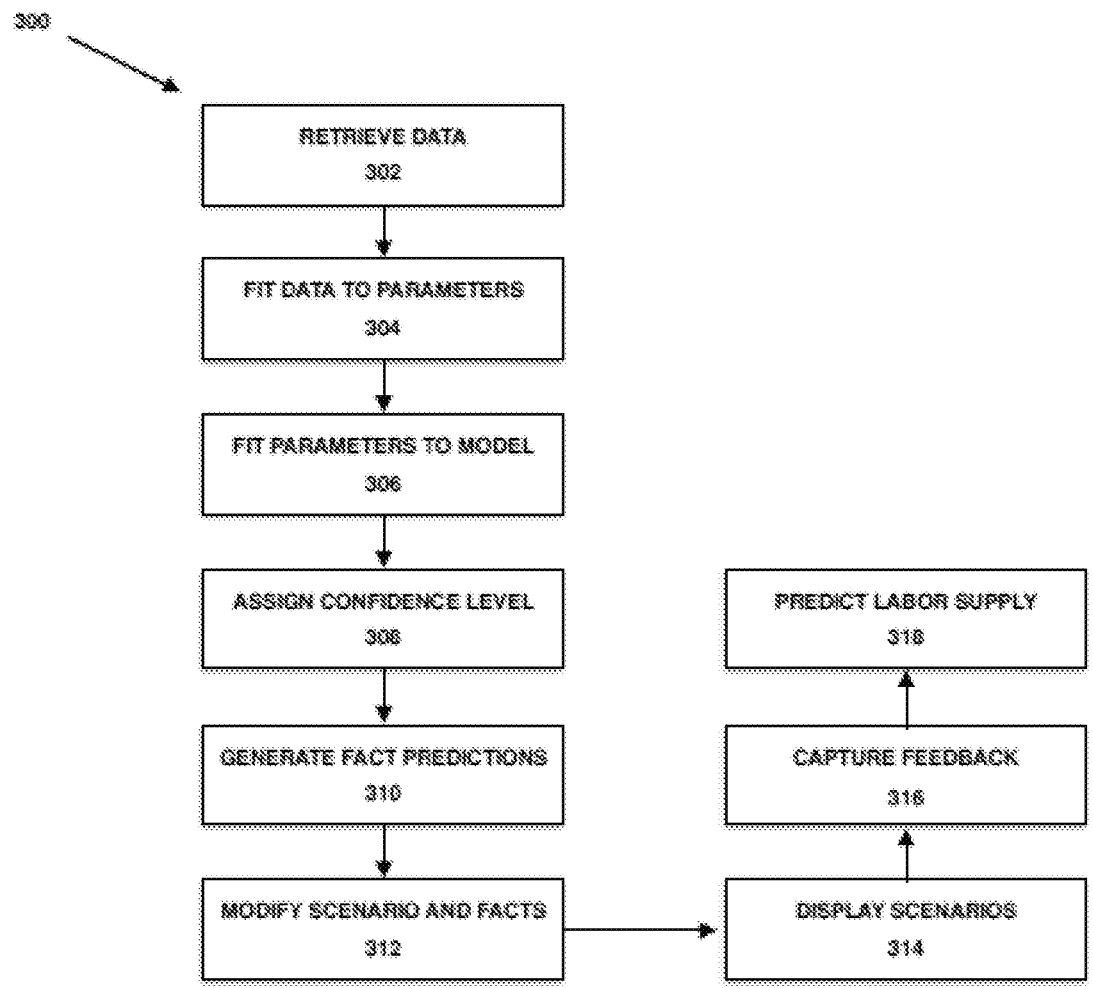
FIG. 3 is another embodiment of a method of using statistical principles and cognitive processes to evaluate historical labor performance of an organization and to predict future labor needs.

FIG. 3 is an embodiment of a method of using statistical principles and cognitive processes to evaluate historical labor performance of an organization and to predict future labor needs. According to one particular implementation, illustrative data includes a historical record of labor claims, including details identifying employ records and dates. Additional fields may capture the role and function of employees. Contract and service details may also be included to provide for a deeper drill down of data.

At 302, data may be retrieved from local and remote computing resources, or a data engineer may periodically access and update data. In this manner, the system may automatically and continuously update the latest labor claims, employee roles, and any additional information.

The system may prepare data to aggregate labor facts into the units of analysis. Unit of analysis selection by a processor may depend on an estimation that is useful for a given purpose. Each unit of analysis may also include additional fields or place holders. The additional fields may be added and may include structured information from external sources or from process feedback loops.

At 304, the statistical modeling module processes, the system may fit historical data to estimation parameters. Such data may be updated periodically as described herein with reference to the learning technology module. In one example, employee hours within a unit of time may be modeled. The unit of time choice may depend on the reporting in place. The model may be selected to fit the historical record of claimed labor by each role/function. The record may be projected into future (e.g., by months) by the system in a scoring step. In one scenario, the system may determine that a unit of time may not have a uniform distribution of hours. For example, a unit may be listed in months, while other units are listed by week. In response, the system may initiate a first correction to make uniform the hour's uniform across units. Continuing with the above example, the system may take a weekly average of the unit listed in months to convert the unit of measurement to weeks.

Predictors, levers, or other parameters of an embodiment of a model may include seasonality factors, covariate and other variables, such as the time of a month or year, an end of a fiscal quarter, or a processing milestone. Other predictors may include pipeline and logistical considerations for contracts or projects, as well as business related levers. External references, as expert forecast or ecological factors, may be included when available.

Model parameters may be fit within the model at 306, and the model factors may be evaluated and assigned a confidence level at 308. The confidence level assignment may include expert feedback. While many different models may be selected by the system, one determination may be made based on whichever model allows lever parameterization so that scoring levers may be applied.

At 310, a scoring module of an embodiment may generate fact predictions (i.e., forecasts) under selected scenarios. Each scenario may depend on a business question to solve. In general, the scenario may reduce to the application of the available levers, or factors, that were fit in the modelling step.

In a steady state scenario example, the system may assume that current conditions remain constant. That is, the conditions are either the same as they were during a last unit of time, a (weighted) average for the last units of time, or with a similar constant trend over time. The system may use model parameter values from a lever composition derived from a function of the last units of time. In a what-if scenario, the system may assume specific scenarios for future unit of times, regardless of past situations. The system may use parameter values to fit an arbitrary future scenario.

A posteriori feedback from a user may be used at 312 to adjust the scenario and forecast. Corrections from user feedback may be oriented to provide a confidence score for results based on user opinion. The corrections may also be used to produce a new scenario that makes the necessary shift from a steady state scenario to accommodate realized facts that happened after the model fit. Because the posteriori feedback may not be evaluated within model fitting, the feedback may contribute a complementary, or parallel, confidence rating related to realized facts, a user opinion, and so on.

For example, an expert feedback module may allow the system to receive expert feedback from a business or other final user. Expert feedback may include human input or alternative data sources that contribute with direct or indirect information relating to forecast drivers, or even a forecast itself. The data may be joined through the interface and may go to the data modeling. Feedback may be structured as being new fields. Measurement levels may be defined as required. Expert feedback may be evaluated within a model, and so the feedback can be used to estimate its uncertainty. In this manner, feedback modelling may allow learning and increased accuracy.

At 314, a visualization module may be used to initially display scenarios. Raw data from previous scenarios may also be available to drill down to more detail. Model levers may be allowed to be tweaked to affect forecasts. User modified visualization may be shared with other users. Levers, or model parameters, tweaked by the user may be saved.

An average for scenario settings as well as each scenario created by a user may be stored and shared with other users, and a library may be created. A new user may be capable of accessing each visualization in the library, as well as choosing new scenarios that result from an average of the levers of selected users. A new user may also be able to assign an opinion to each visualization in the library.

At 316, a final user feedback module may capture final user feedback through visualization, and may be provided for a detailed or overview level. Feedback may include an evaluation for forecast results for each visualization and details within a visualization. The feedback may also include correct scenario settings that correspond closely to realized facts or user knowledge on correct levers settings. Other feedback may comprise opinions on available visualizations.

The first use of user feedback may be in connection with visualization (e.g., for a ranking criterion). A second use of user feedback may be to ensure the most accurate levers (i.e., parameters) settings, either through a ranking or a weighted average. The lever/parameter values may be used to tweak scoring settings and to adjust model fit to the most accurate, or convenient, scenario. Setting correct values in the scoring phase (and based on a model) may allow a more accurate and objective estimations of future facts.

The system may predict labor supplies at 318. For instanced, a predicted labor supply approach may leverage databases to currently available resources of the workforce of a company. The approach may use statistical modeling techniques. The system may use data sources that are internal to the company to factor in attrition, as well as planned or unplanned growth. An embodiment of the system may combine algorithms at 314 to articulate a monthly predicted labor supply expressed in terms of a calculated full time equivalent (FTE) for each of the skill groupings by geographic region.

According to another embodiment, a predicted labor demand approach may be determined at 318 by bringing together two statistical models. A first model may predict labor demands for all existing business. The second model may predict existing demand for new business. Each model may use statistical principles to predict the labor needs based on historical data sources such as labor claiming and contract data for existing business. The models may be combined to articulate a monthly predicted labor demand. The monthly predicted labor demand may be expressed in terms of a calculated FTE for each of the skill groupings by geographic region.

Another embodiment of the system may perform processes at 318 directed towards a predicted labor gaps and gluts approach. Gaps and gluts processes may include a calculation that subtracts the demand from the supply. The gaps and gluts may be calculated and expressed in terms of a monthly predicted labor gap (e.g., where a shortage is predicted) or glut (e.g., where an excess of resource is predicted). The gaps and gluts may be expressed in terms of a monthly calculated FTE gap or glut for each of skill grouping by geographic region. The system may output results that show a monthly average gap or glut for each of the groupings.

Figure 4:
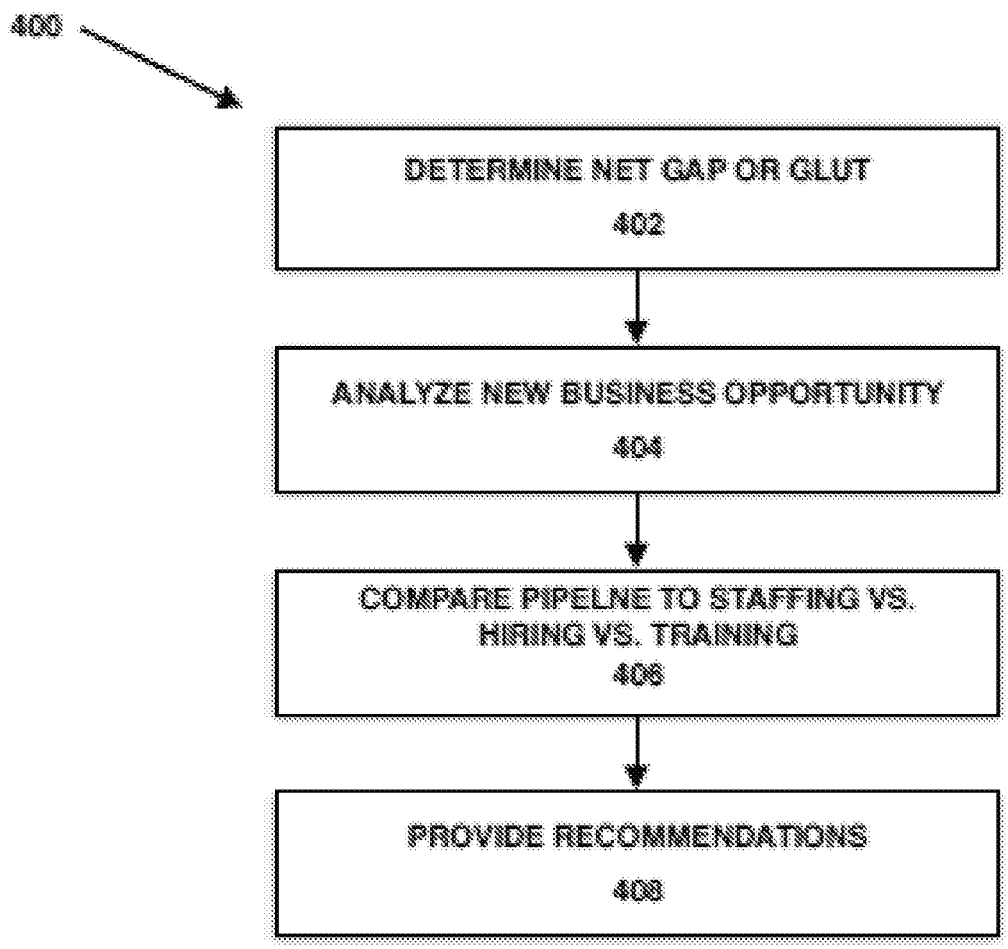
FIG. 4 is an embodiment of blending predictive analytics with human intelligence to generate resource action plans.

FIG. 4 illustrates an embodiment of a method of blending predictive analytics with human intelligence to generate resource action plans. At 402, an embodiment of the system may determine a net gap or a glut. The net may be adjusted for automation and productivity targets. At 404, the system, such as the system 100 of FIG. 1, may analyze a new business opportunity. The system may at 406 compare deals in a pipeline to staffing versus hiring versus training plans. The system may at 408 provide recommendations regarding hiring and retraining to cover strategic growth.

Figure 5:
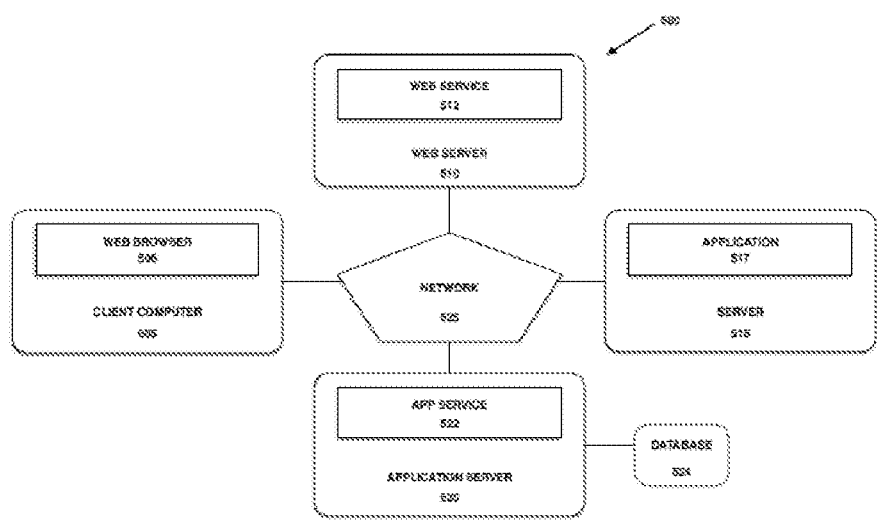
FIG. 5 illustrates another example computing system according to one embodiment, such as may be realized using a networked environment.

FIG. 5 illustrates another example computing system according to one embodiment, such as may be realized using a networked environment. As shown, the computing environment 500 includes a client computer 505, a web server 510, a server 515, and an application server 520. The client computer 505 may be a physical system (e.g., a desktop, laptop computer, mobile device, etc.) or a virtual computing instance executing in the cloud. The client computer 505 includes a web browser 507. A user may access data services through the web browser 507 over a network 525 (e.g., the Internet).

For instance, a user may access a web service 512 executing on a web server 510. In one embodiment, the web service 512 provides a web interface for an application server 520 (e.g., executing an application service 522). More specifically, the application service 522 provides a database 524. The database 524 may include data presented to users on the web browser 507.

Figure 6:
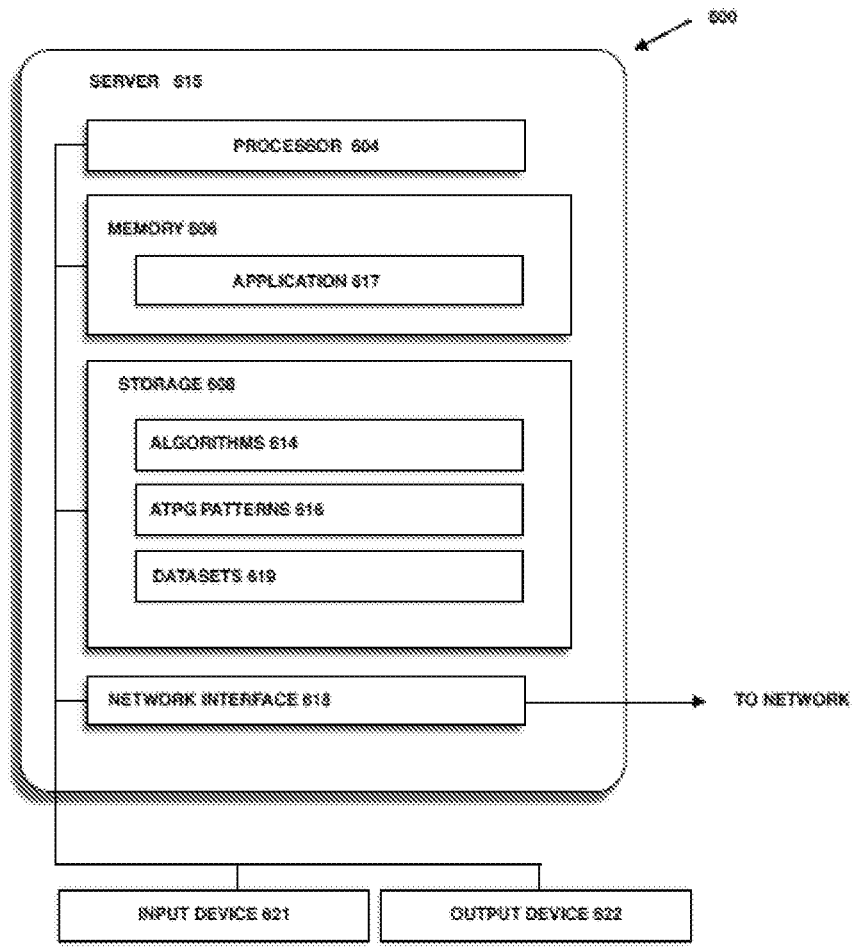
FIG. 6 further illustrates a server, such as the server of FIG. 5, according to one embodiment.

FIG. 6 further illustrates a server 615, such as the server 515 of FIG. 5, according to one embodiment. The server 615 generally includes a processor 604 connected via a bus to a memory 606, a network interface device 618, a storage 608, an input device 621, and an output device 624. The server 615 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 604 is included to be representative of a single CPU, multiple CPUs, a single CPU having multiple processing cores, and the like. Similarly, the memory 606 may be a random access memory. While the memory 606 is shown as a single identity, it should be understood that the memory 606 may comprise a plurality of modules, and that the memory 606 may exist at multiple levels, from high speed registers and caches to lower speed but larger DRAM chips. The network interface device 618 may be any type of network communications device allowing the navigation server 610 to communicate with other computers via the network 625.

The storage 608 may be a persistent storage device. Although the storage 608 is shown as a single unit, the storage 608 may be a combination of fixed and/or removable storage devices, such as fixed disc drives, solid state drives, removable memory cards, optical storage and network storage systems.

As shown, the memory 606 contains the application 617, which may be an application generally executed to take actions described herein. Storage 608 contains the algorithms 614, cognitive learning 616, and datasets 619.

The input device 621 may provide a keyboard and/or a mouse, etc. The output device 624 may be any conventional display screen. Although shown separately from the input device 621, the output device 624 and input device 621 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., threshold adjustment algorithms) or related data available in the cloud. For example, the modules of FIG. 1 could execute on a computing system in the cloud and. In such a case, the threshold adjustment algorithms could adjust response thresholds and store the new values at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof. While certain embodiments are applicable to spoken language systems, the claims are not limited or even particularly applicable to spoken language interfaces. In one example, an embodiment of a method may not relate to speech modality. The scope thereof is thus determined by the claims that follow.

What is claimed is:

1. A computer-implemented process for cognitive labor forecasting, the computer-implemented process comprising:

in response to receiving information including a historical record of labor claims at a level of employee and date detail, employee role/function detail, contract and service details, aggregating, by a hardware processor, labor facts into selective units of analysis including additional fields as place holders added to each unit of analysis comprising structured information from external sources;

modeling, by the hardware processor, the information received, using a selected one of a set or predetermined models, to fit historical data comprising the historical record of claimed labor by each role/function to estimation parameters projected into future months used in a scoring operation using parameters for a model including seasonality factors, pipeline for contracts and projects, business related levers and external references including an expert forecast;

evaluating, by the hardware processor, a result of modeling to determine a fit of model factors within the selected model;

assigning, by the hardware processor, a confidence level to the model using a determination of fit of model factors within the selected model;

generating, by the hardware processor, a set of fact predictions under selected scenarios, wherein the selected scenario is one of a steady state scenario and a what-if scenario and depends on the model factors that fit in the result of modeling and wherein posteriori feedback from a user is used to adjust a scenario and a forecast and wherein corrections from the feedback are oriented to provide a confidence score for results based on the feedback;

receiving, by the hardware processor, expert feedback as a priori feedback comprising human input and alternative data sources contributing as one of direct and indirect information on one of forecast drivers and a forecast;

augmenting, by the hardware processor, learning within and accuracy of the selected model using the expert feedback;

generating, by the hardware processor, a visualization of the selected scenario enabling raw data from previous scenarios for drill down, model factors to be tweaked to affect a respective forecast, sharing of a user modified visualization, creating a library of visualizations and assignment of an opinion to each visualization in the library;

capturing, by the hardware processor, feedback from the user through the visualization comprising an evaluation for forecast results for each visualization and details within the visualization, correct scenario settings, corresponding to realized facts and user knowledge of correct factor settings and user opinions on available visualizations, wherein the user feedback is used for a ranking criterion and identifying parameter settings using one of a ranking and a weighted average;

tweaking, by the hardware processor, the confidence score using the parameter settings; and adjusting, by the hardware processor, the model fit to a respective scenario using the parameter settings.

2. The computer-implemented method of claim 1, further comprising identifying patterns based on seasonality and a recent performance.

3. The computer-implemented method of claim 1, further comprising identifying a parametric identifier selected from a list including at least one of: a skill type, a location, and an experience level of a worker.

4. The computer-implemented method of claim 1, wherein the what-if analyses includes manipulating a lever/model parameter to affect predictive modeling to drive a different outcome.

5. The computer-implemented method of claim 1, further comprising using learning technology to learn from an earlier modeling iteration.

6. The computer-implemented method of claim 1, wherein the historical data includes at least one of: time spent by resources on work performed in the past, a type of resource, and information describing the type of the work performed.

7. The computer-implemented method of claim 1, further comprising performing a conversion of a unit of data based on another type of a unit of data.

8. The computer-implemented method of claim 1, further comprising determining a plurality of parameters to be used for statistical modeling.

9. The computer-implemented method of claim 1, further comprising determining the model is a fit to a group of circumstances comprising at least one of: data quality, completeness, and a desired outcome of the prediction.

10. The computer-implemented method of claim 1, further comprising enabling a user to modify a model parameter using the graphical visualization module.

11. The computer-implemented method of claim 1, wherein the parameters include a seasonality factor, a covariate variable, a time period, a processing threshold, a logistical consideration, a contractual consideration, and expert forecast, and an ecological factor.

12. The computer-implemented method of claim 1, further comprising selecting the model based on a capacity to allow parameter adjustment and inclusion and scoring.

13. The computer-implemented method of claim 1, further comprising using the user feedback to determine the parameters and the ranking criterion.

14. The computer-implemented method of claim 1, further comprising using an internal data source based on a group of factors including at least one of: attrition, planned growth, and unplanned growth expressed in terms of a calculated full time equivalent (FTE) for one of a plurality of skill groups based on a geographic region.

15. The computer-implemented method of claim 1, further comprising combining models to generate a predicted labor demand growth expressed in terms of a calculated full time equivalent (FTE) for one of a plurality of skill groups based on a geographic region.

16. The computer-implemented method of claim 1, further comprising determining a gap or a glut using a predicted demand and a predicted supply.

17. An apparatus comprising:
a hardware processor configured to implement:
a data module configured to retrieve information including a historical record of labor claims at a level of employee and date detail, employee role/function detail, contract and service details, and to aggregate labor facts into selective units of analysis including additional fields as place holders added to each unit of analysis comprising structured information from external sources;

a modeling module configured to model the information received, using a selected one of a set or predetermined models, to fit historical data comprising the historical record of claimed labor by each function to estimation parameters projected into future months used in a scoring operation using parameters for a model including seasonality factors, pipeline for contracts and projects, business related levers and external references including an expert forecast;

a model fit module configured to evaluate a result of modeling to determine a fit of model factors within the selected model;

a confidence module configured to assign a confidence level to the model using a determination of fit of model factors within the selected model;

a predictive models module configured to generate a set of fact predictions under selected scenarios, wherein the selected scenario is one of a steady state scenario and a what-if scenario and depends on the model factors that fit in the result of modeling and wherein posteriori feedback from a user is used to adjust a scenario and a forecast and wherein corrections from the feedback are oriented to provide a confidence score for results based on the feedback;

a feedback module configured to receive human input and alternative data sources contributing as one of direct and indirect information on one of forecast drivers and a forecast, wherein the modeling module is further configured to augment learning within and accuracy of the selected model using the human input and alternative data sources; and a visualization module configured to generate a visualization of the selected scenario enabling raw data from previous scenarios for drill down, model factors to be tweaked to affect a respective forecast, sharing of a user modified visualization, creating a library of visualizations and assignment of an opinion to each visualization in the library; wherein the feedback is captured through the visualization comprising an evaluation for forecast results for each visualization and details within the visualization, correct scenario settings, corresponding to realized facts and user knowledge of correct factor settings and user opinions on available visualizations, wherein the user feedback is used for a ranking criterion and identifying parameter settings using one of a ranking and a weighted average, wherein the model fit module is further configured to adjust the model fit to a respective scenario using the parameter settings, and wherein the confidence module is further configured to tweak the confidence score using the parameter settings.

18. The apparatus of claim 17, wherein the model is selected based on a capacity to allow parameter adjustment and inclusion and scoring.

19. The apparatus of claim 17, wherein the user feedback is used to determine the parameters and the ranking criterion.

20. A program product for cognitive labor forecasting, the program product comprising a non-transitory computer readable storage medium having computer readable program code embodied therewith, the non-transitory computer readable program code executable by a processor to access the memory and to execute the program code to:

in response to receiving information including a historical record of labor claims at a level of employee and date detail, employee role detail, contract and service details, aggregate labor facts into selective units of analysis including additional fields as place holders added to each unit of analysis comprising structured information from external sources;

model the information received, using a selected one of a set or predetermined models, to fit historical data comprising the historical record of claimed labor by each role/function to estimation parameters projected into future months used in a scoring operation using parameters for a model including seasonality factors, pipeline for contracts and projects, business related levers and external references including an expert forecast;

evaluate a result of modeling to determine a fit of model factors within the selected model;

assign a confidence level to the model using a determination of fit of model factors within the selected model;

generate a set of fact predictions under selected scenarios, wherein the selected scenario is one of a steady state scenario and a what-if scenario and depends on the model factors that fit in the result of modeling and wherein posteriori feedback from a user is used to adjust a scenario and a forecast and wherein corrections from the feedback are oriented to provide a confidence score for results based on the feedback;

receive expert feedback as a priori feedback comprising human input and alternative data sources contributing as one of direct and indirect information on one of forecast drivers and a forecast;

augmenting learning within and accuracy of the selected model using the expert feedback;

generate a visualization of the selected scenario enabling raw data from previous scenarios for drill down, model factors to be tweaked to affect a respective forecast, sharing of a user modified visualization, creating a library of visualizations and assignment of an opinion to each visualization in the library; and capture feedback from the user through the visualization comprising an evaluation for forecast results for each visualization and details within the visualization, correct scenario settings, corresponding to realized facts and user knowledge of correct factor settings and user opinions on available visualizations, wherein the user feedback is used for a ranking criterion and identifying parameter settings using one of a ranking and a weighted average;

tweaking the confidence score using the parameter settings; and adjusting the model fit to a respective scenario using the parameter settings.

\* \* \* \* \*